United States Patent
Fischer et al.

(10) Patent No.: US 7,607,683 B2
(45) Date of Patent: Oct. 27, 2009

(54) VEHICLE OCCUPANT PROTECTION APPARATUS WITH POCKET AND METHOD OF MAKING SAME

(75) Inventors: Kurt F. Fischer, Leonard, MI (US); Eric J. Eckelberg, Macomb, MI (US); Alberto Rodriguez, Rochester Hills, MI (US); Heather R. Kramer, Macomb, MI (US); Amit Sharma, Rochester Hills, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 208 days.

(21) Appl. No.: 11/432,062

(22) Filed: May 11, 2006

(65) Prior Publication Data

US 2007/0262572 A1 Nov. 15, 2007

(51) Int. Cl.
B60R 21/16 (2006.01)
(52) U.S. Cl. ............... 280/730.1; 280/730.2; 280/743.1
(58) Field of Classification Search ............... 280/730.1, 280/743.1, 731, 732, 743.2
See application file for complete search history.

(56) References Cited

U.S. PATENT DOCUMENTS

| | | | |
|---|---|---|---|
| 5,213,361 A | 5/1993 | Satoh et al. | |
| 5,934,701 A | 8/1999 | Furukawa | |
| 5,945,184 A | 8/1999 | Nagata et al. | |
| 6,283,500 B1 | 9/2001 | Eckert et al. | |
| 6,361,072 B1 | 3/2002 | Barnes | |
| 6,536,800 B2 | 3/2003 | Kumagai et al. | |
| 6,834,886 B2 | 12/2004 | Hasebe et al. | |
| 7,131,664 B1 * | 11/2006 | Pang et al. | 280/743.2 |
| 7,152,880 B1 * | 12/2006 | Pang et al. | 280/743.2 |
| 7,207,594 B2 * | 4/2007 | Igawa et al. | 280/730.1 |
| 7,350,807 B2 * | 4/2008 | Schneider et al. | 280/732 |
| 2003/0218325 A1 | 11/2003 | Hasebe et al. | |
| 2004/0245751 A1 | 12/2004 | Marotzke et al. | |
| 2006/0028009 A1 | 2/2006 | Hasebe et al. | |

(Continued)

FOREIGN PATENT DOCUMENTS

WO 03/101788 12/2003

(Continued)

OTHER PUBLICATIONS

Research Disclosure, Aug. 1999, No. 424 entitled "Dual Compartment Air Bag".

*Primary Examiner*—Paul N Dickson
*Assistant Examiner*—Drew Brown
(74) *Attorney, Agent, or Firm*—Tarolli, Sundheim, Covell & Tummino LLP

(57) ABSTRACT

An apparatus for helping to protect an occupant (15 or 16) of a vehicle (17) includes an inflatable vehicle occupant protection device (10) and an inflation fluid source. The inflatable vehicle occupant protection device (10) has a stored, deflated position and an inflated position. The inflation fluid source provides inflation fluid to inflate the inflatable vehicle occupant protection device (10). The inflatable vehicle occupant protection device (10) has a first panel portion (501) for, when the inflatable vehicle occupant protection device (10) is inflated, protecting an adult size vehicle occupant (15). The inflatable vehicle occupant protection device (10) has a second panel portion (502) for, when the inflatable vehicle occupant protection device (10) is inflated, defining a downwardly open pocket (520) for receiving a portion of a child size vehicle occupant (16).

15 Claims, 4 Drawing Sheets

U.S. PATENT DOCUMENTS

| | | | |
|---|---|---|---|
| 2006/0186647 A1* | 8/2006 | Bosch | 280/729 |
| 2007/0024032 A1* | 2/2007 | Hasebe | 280/729 |
| 2007/0108753 A1* | 5/2007 | Pang et al. | 280/743.2 |
| 2007/0200319 A1* | 8/2007 | Idomoto et al. | 280/729 |

FOREIGN PATENT DOCUMENTS

| | | |
|---|---|---|
| WO | 2004/078534 | 9/2004 |

* cited by examiner

VEHICLE OCCUPANT PROTECTION APPARATUS WITH POCKET AND METHOD OF MAKING SAME

FIELD OF INVENTION

The present invention relates to an apparatus for helping to protect a vehicle occupant in a vehicle collision, and particularly relates to an inflatable vehicle occupant protection device, such as an air bag.

BACKGROUND OF THE INVENTION

A conventional air bag in a vehicle expands into the space between an instrument panel and a vehicle occupant when a vehicle collision occurs. Known air bags have functioned to protect adults and children in a vehicle collision.

SUMMARY OF THE INVENTION

An apparatus in accordance with the present invention helps protect an adult or child in a vehicle collision. The apparatus includes an inflatable vehicle occupant protection device and an inflation fluid source. The inflatable vehicle occupant protection device has a stored, deflated position and an inflated position. The inflation fluid source provides inflation fluid to inflate the inflatable vehicle occupant protection device. The inflatable vehicle occupant protection device has a first panel portion for, when the inflatable vehicle occupant protection device is inflated, engaging and protecting an adult vehicle occupant. The inflatable vehicle occupant protection device has a second panel portion for, when the inflatable vehicle occupant protection device is inflated, defining a downwardly open pocket for receiving a child vehicle occupant.

Also, an apparatus in accordance with the present invention includes an inflatable vehicle occupant protection device and an inflation fluid source. The inflatable vehicle occupant protection device has a stored, deflated position and an inflated position. The inflation fluid source provides inflation fluid to inflate the inflatable vehicle occupant protection device to the inflated position. The inflatable vehicle occupant protection device, when inflated, has a back panel portion for engaging the vehicle occupant, a front panel portion adjacent the inflation fluid source, a first side panel portion adjacent an outboard side of the inflatable vehicle occupant protection device, and a second side panel portion adjacent an inboard side of the inflatable vehicle occupant protection device. The back panel portion has an upper portion and a lower portion. The lower portion includes a first lower surface extending downward from the upper portion adjacent the outboard side of the inflatable vehicle occupant protection device and a second lower surface extending downward from the upper portion adjacent the inboard side of the inflatable vehicle occupant protection device. The first and second lower surfaces define an opening of a downwardly open pocket. The downwardly open pocket extends from the upper portion of the back panel portion to a bottom of the back panel portion. The downwardly open pocket receives a head of a child in a rearwardly facing child seat to help protect the child when the inflatable vehicle occupant protection device is inflated.

A method for making an inflatable vehicle occupant protection device for a vehicle in accordance with the present invention comprises the steps of: removing a rectangular portion of material from a first panel to define a rectangular opening having a length, a width, and a perimeter; folding the first panel so that opposite ends of the first panel overlap; attaching a second panel to the first panel along a first edge of the first panel to form a first side portion; attaching a third panel to the first panel along a second edge of the first panel to form a second side portion; and attaching a fourth panel to the first panel along the perimeter of the rectangular opening, the fourth panel having a perimeter related to the perimeter of the rectangular opening such that, when the inflatable vehicle occupant protection device is inflated, a downwardly open pocket is formed for receiving a child.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF EXAMPLE EMBODIMENTS

Figure 1:
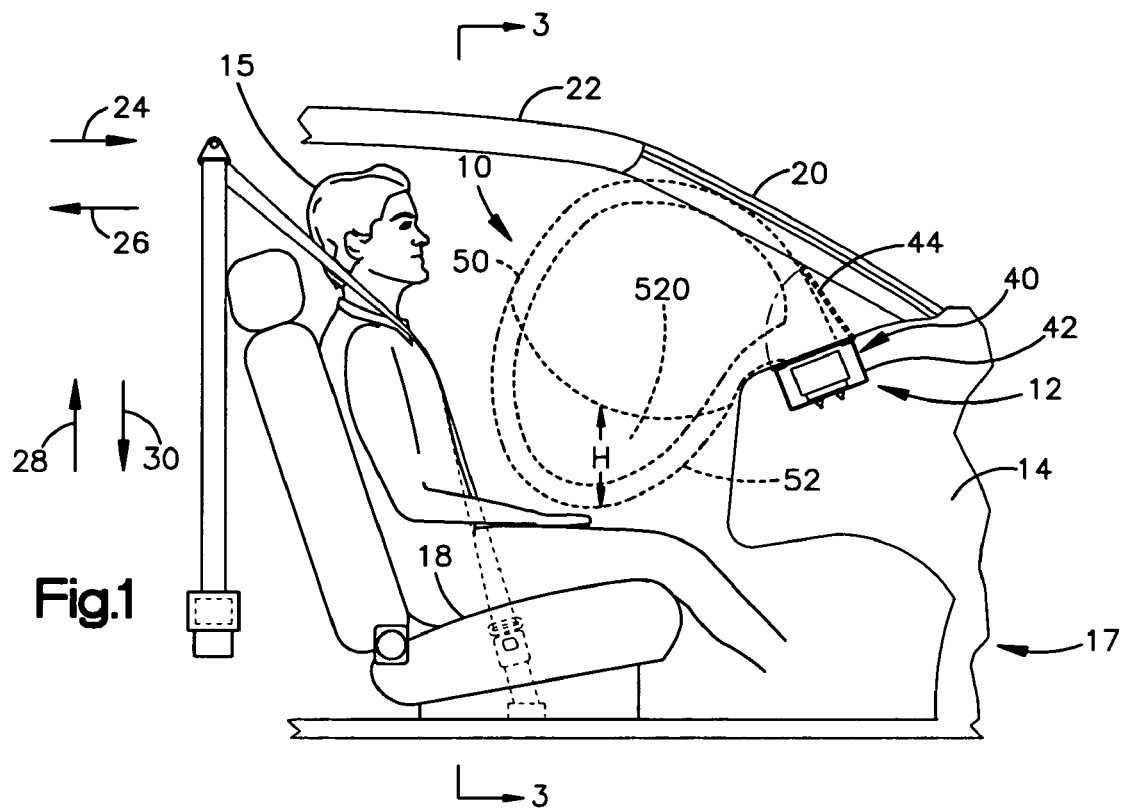
FIG. 1 is a schematic side view of an apparatus in accordance with the present invention with an air bag shown in phantom in an inflated condition.
Figure 2:
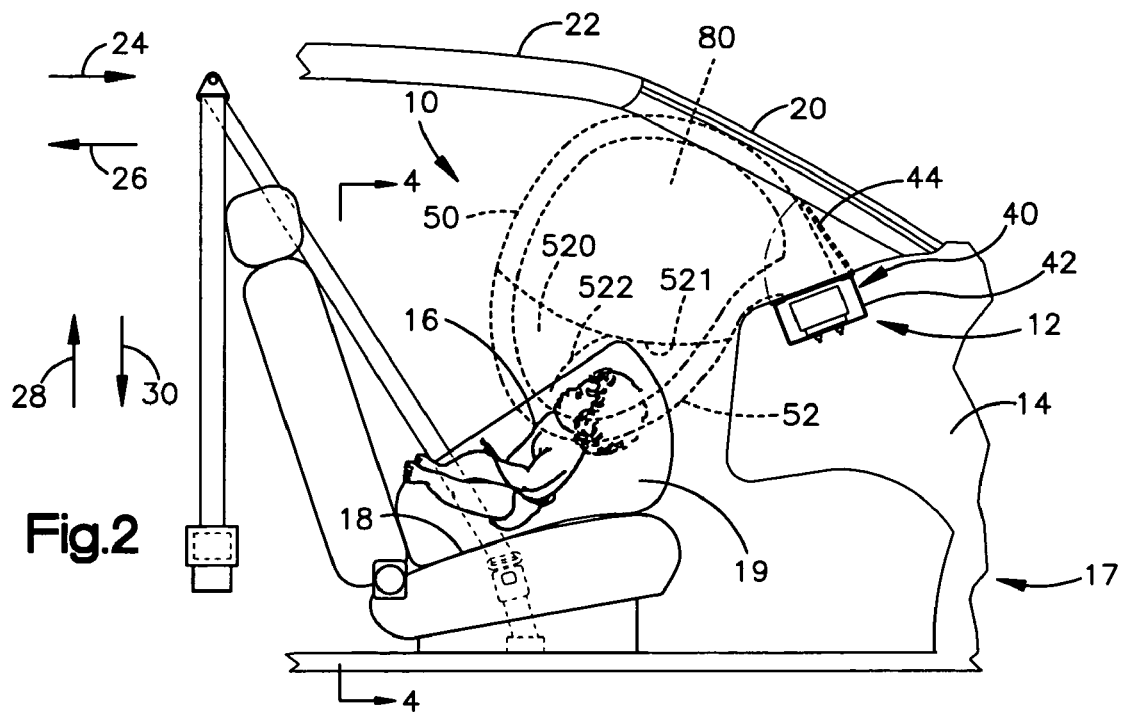
FIG. 2 is a schematic side view of the apparatus of FIG. 1 under a different condition with the air bag shown in phantom in an inflated condition.

An apparatus in accordance with the present invention relates to an inflatable vehicle occupant protection device, such as a vehicle air bag. As one example of the apparatus, FIGS. 1 and 2 illustrate an air bag 10. The air bag 10 forms part of an air bag module 12 that is mounted in an instrument panel 14 of a vehicle 17. The air bag module 12 may alternatively be mounted in any other suitable location in the vehicle 17.

The air bag module 12 also includes an inflator that contains an inflation fluid source for providing inflation fluid to inflate the air bag 10. The inflation fluid source may be a stored quantity of pressurized inflation fluid and an ignitable material for heating the inflation fluid. The inflation fluid source alternatively could be gas-generating material which, when ignited, generates inflation fluid in the form of gas to inflate the air bag 10, or could be a stored quantity of pressurized inflation fluid for inflating the air bag.

As the description of the present invention proceeds, reference will be made to directions. As shown in FIG. 1, a forward, or front, direction is illustrated by the arrow 24, and a rearward, or back, direction by the arrow 26. An upward direction in the vehicle 17 is illustrated by the arrow 28 and a downward direction in the vehicle is illustrated by the arrow 30.

In FIGS. 1 and 2, the air bag module 12 is mounted in an upward facing location in the instrument panel 14, and is thus a "top-mount" type module. The air bag module 12 includes a cannister 40 secured in the instrument panel 14 in a suitable manner (not shown). The canister 40 contains the air bag 10 and the inflator. The cannister 40 includes a main body portion 42, which defines a chamber, and a cover 44, which closes the cannister. The cover 44 may be hinged to the main body portion 42 of the cannister 40 at the top of the cannister. It should be understood that the cannister 40 may have a different configuration from the one shown, or may be a portion of the instrument panel 14 itself.

The vehicle 17 includes a front passenger seat 18 for an occupant 15 or 16 of the vehicle. The vehicle windshield 20 extends upward and rearward from the instrument panel 14, and merges with the vehicle roof 22.

Figure 3:
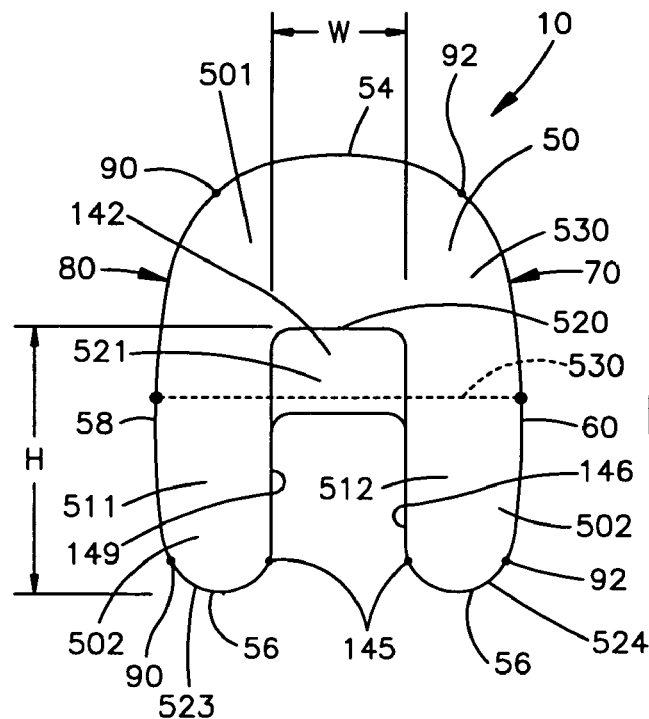
FIG. 3 is a schematic elevation view of the inflated airbag of FIG. 1 taken along line 3-3 of FIG. 1.

The air bag 10 (FIGS. 1 & 2) includes a contact face or back panel portion 50 and a front panel portion 52. The back panel portion 50 is, preferably, a single piece of material. The back panel portion 50 may, alternatively, be constructed of a plurality of pieces of fabric material that are sewn together to form the back panel portion. The back panel portion 50, when the air bag 10 is inflated, has a generally rectangular configuration, with rounded corners (FIG. 3). Further, when the air bag 10 is inflated, the back panel portion 50 has a top edge 54, a bottom edge 56, and inboard and outboard side edges 58 and 60.

The front panel portion 52 is, preferably, a single piece of material. The front panel portion 52 may, alternatively, be constructed of a plurality of pieces of fabric material that are sewn together to form the front panel portion. The front panel portion 52 has a generally rectangular configuration, with rounded corners, when the air bag 10 is inflated.

The air bag 10 further includes a first, outboard side panel portion 70, which connects the back panel portion 50 and the front panel portion 52 (FIG. 3). The first side panel portion 70 is preferably made from a single piece of material. The first side panel portion 70 may, alternatively, be made from a plurality of pieces of fabric materials that are sewn together to form the first side panel portion. The first side panel portion 70 extends between the back panel portion 50 and the front panel portion 52 when the air bag 10 is inflated.

The air bag 10 further includes a second, inboard side panel portion 80, which connects the back panel portion 50 and the front panel portion 52 (FIG. 3). The second side panel portion 80 is preferably made from a single piece of material. The second side panel portion 80 may, alternatively be made from a plurality of pieces of fabric materials that are sewn together to form the second panel portion. The second side panel portion 80 extends between the back panel portion 50 and the front panel portion 52 when the air bag 10 is inflated.

Each of the first and second side panel portions 70, 80 has a general configuration of an oval when the air bag 10 is inflated, as viewed as in FIGS. 1 and 2, extending from the back panel portion 50 to the front panel portion 52.

Figure 5:
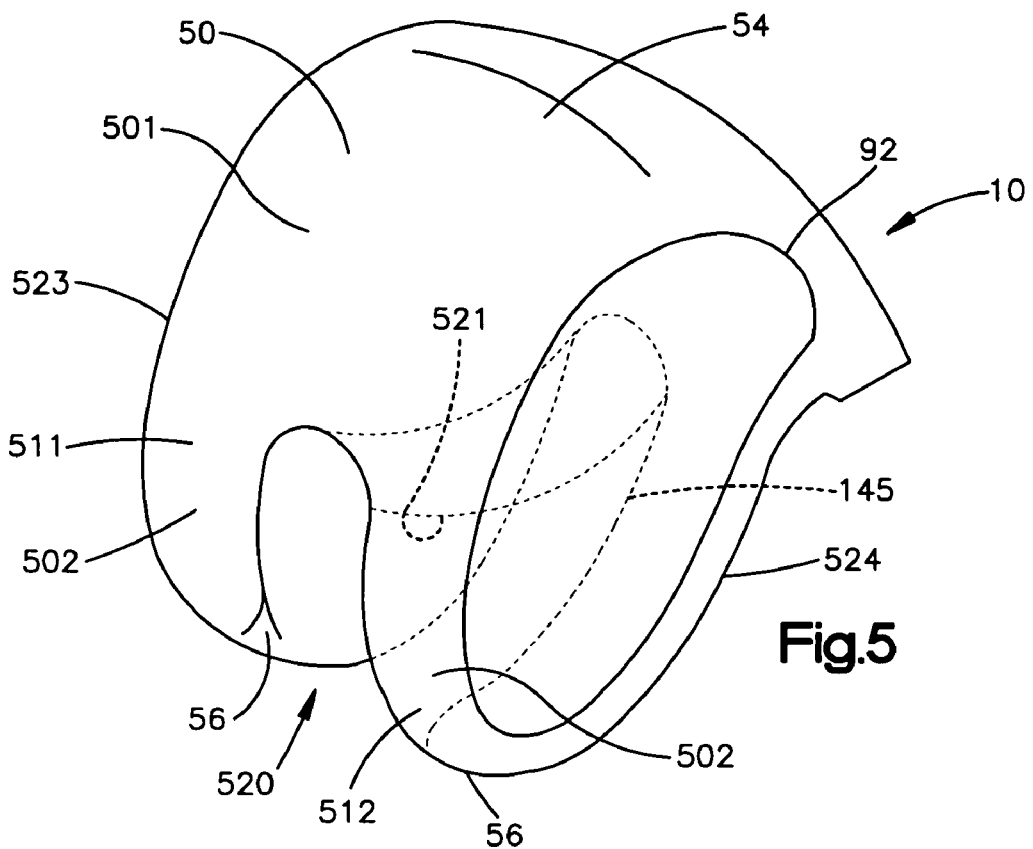
FIG. 5 is a schematic isometric representation of the inflated air bag of FIGS. 1 and 2.

The first and second side panel portions 70, 80 are sewn to the back panel portion 50 and front panel portion 52 with first and second continuous, and generally oval, seams 92, 90, respectively (FIGS. 3 & 5). The first seam 92 extends completely around the first side panel portion 70 on the first, outboard side of the inflated air bag 10. The second seam 90 extends completely around the second side panel portion 80 on the first, inboard side of the inflated air bag 10.

The back panel portion 50 (FIG. 3) has an upper portion 501 and a lower portion 502 opposite the upper portion. The lower portion 502 includes a first lower surface 511 extending downward from the upper portion 501 adjacent the outboard side of the air bag 10 and a second lower surface 512 extending downward from the upper portion adjacent the inboard side of the air bag.

Figure 4:
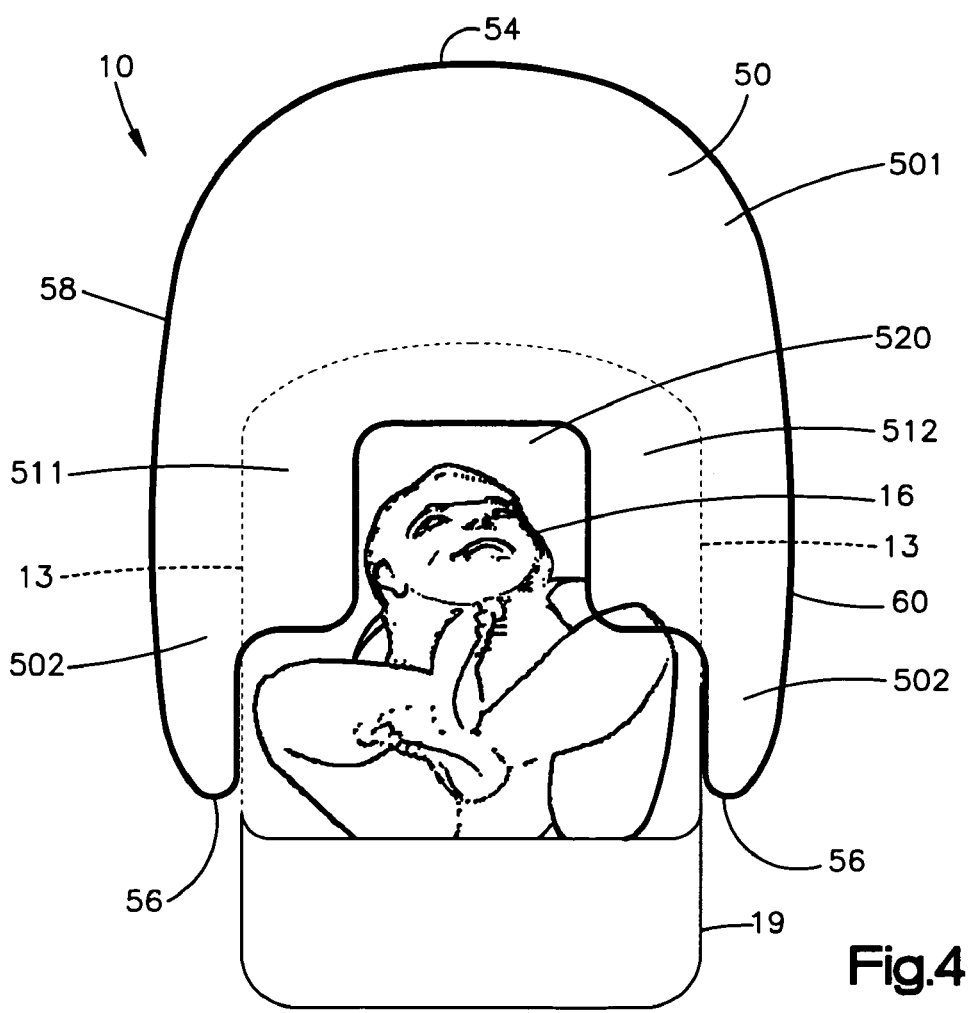
FIG. 4 is a schematic elevation view of the inflated airbag of FIG. 2 taken along line 4-4 of FIG. 2.

The first and second lower surfaces 511, 512 partly define an opening of a downwardly open pocket 520 extending from the upper portion 501 of the back panel portion 50 to the bottom edge 56 of the back panel portion (FIG. 3). While the upper portion 501 of the back panel portion 50 may engage and help protect an adult size vehicle occupant 15 (FIG. 1), the downwardly open pocket 520 may receive the head of a child size vehicle occupant 16 of the vehicle (FIG. 2). In this case, the lower surfaces 511, 512 of the back panel portion 50 of the air bag 10 may contact and stabilize a rearwardly facing child seat 19, but the downwardly open pocket 520 allows the air bag 10 to receive the head of the child size vehicle occupant 16, including a child in a rearwardly facing child seat 19 (FIG. 4).

The downwardly open pocket 520 extends rearward from the back panel portion 50 to the front panel portion 52 to form a channel that is centered along the lateral middle portion of the vehicle seat 18 when the air bag 10 is inflated. Thus, as long as the head of the child size vehicle occupant 16 is in the middle area of the vehicle seat 18 (such as when occupying a child seat 19), the air bag 10 will avoid contacting the head of the child size vehicle occupant 16 as the lower surfaces 511, 512 of the lower portion 502 of the back panel portion 50 of the air bag inflate around the head of the child size vehicle occupant. Thus, the child will not directly engage the inflated air bag 10, but still be protected by the inflated air bag.

As shown in FIG. 5, the downwardly open pocket 520 forms a curved configuration having an arcuate, convex upper surface 521, a first arcuate, convex lower surface 523, and a second arcuate, convex lower surface 524. Parts of the first and second arcuate surfaces 523, 524 form the first and second lower surfaces 511, 512 of the lower portion 502 of the back panel portion 50.

To prevent the lower surfaces 511, 512 from expanding outward laterally in the vehicle 17 away from each other during inflation of the air bag 10, an internal tether 530 (FIG. 3) may optionally be attached to internal walls of the first and second side panel portions 70, 80. The internal tether 530 thereby maintains the width of the downwardly open pocket 520 and ensures that the lower surfaces 511, 512 at least partially contact and stabilize laterally spaced apart surfaces 13 of the child seat 19 (FIG. 4).

The width of the downwardly open pocket 520 and corresponding tether 530 may be, for example, sized for 120 mm (i.e., a twelve month year old average infant's head width) such that the air bag 10, when inflated, surrounds the head from above and 180 degrees around the sides of the head. A flap 522 (FIG. 2) may also be attached in a suitable manner to the air bag 10 within the downwardly open pocket 520 so that the flap protects and lies loosely over the head of the child size vehicle occupant 16.

The air bag 10 may also include pleats 147, 148 (FIG. 7) located in an upper portion of the downwardly open pocket 520 when the air bag is inflated. These pleats 147, 148 extend generally from front to back in the directions 24, 26 in the part of the air bag 10 defining the upper portion of the downwardly open pocket 520.

When the air bag 10 is inflated, the material around the pleats 147, 148 is tensioned. The pleats 147, 148, which are folds of excess material located along the upper corners of the downwardly open pocket 520, allow the upper portion of the downwardly open pocket to expand to a full uniform internal width W throughout the height H of the pocket and further ensure that the head of the child size vehicle occupant 16 is not contacted.

A method of making the air bag 10 begins with providing a one-piece single sheet 100 (FIG. 6) comprising both the back and front panel portions 50, 52. Each end 111, 112 of the single sheet 100 has an opening 121, 122. The single sheet 100 also has a generally rectangular opening 131. The rectangular opening 131 has a length A, a width B, and a perimeter C.

The first end 111 is positioned such that the first end overlaps the second end 112 and the openings 121, 122 align to receive inflation fluid from the inflation fluid source. The first and second ends 111, 112 are then attached in a suitable manner to form an open sided generally oval configuration. The open sided generally oval configuration has a first generally oval edge and a second generally oval edge opposite the first generally oval edge (FIGS. 1 & 2).

A first, generally oval side panel 70 is attached to the first generally oval edge at seam 90 to form a first side portion of the air bag 10. A second, generally oval side panel 80 is attached to the second generally oval edge at seam 92 to form a second side portion of the air bag 10. A pocket panel 141, having a length D, a width E, and a perimeter F, which is slightly larger than the perimeter C of the rectangular opening 131, is attached at the perimeter of the rectangular opening in a suitable manner, such as by sewing.

Figure 7:
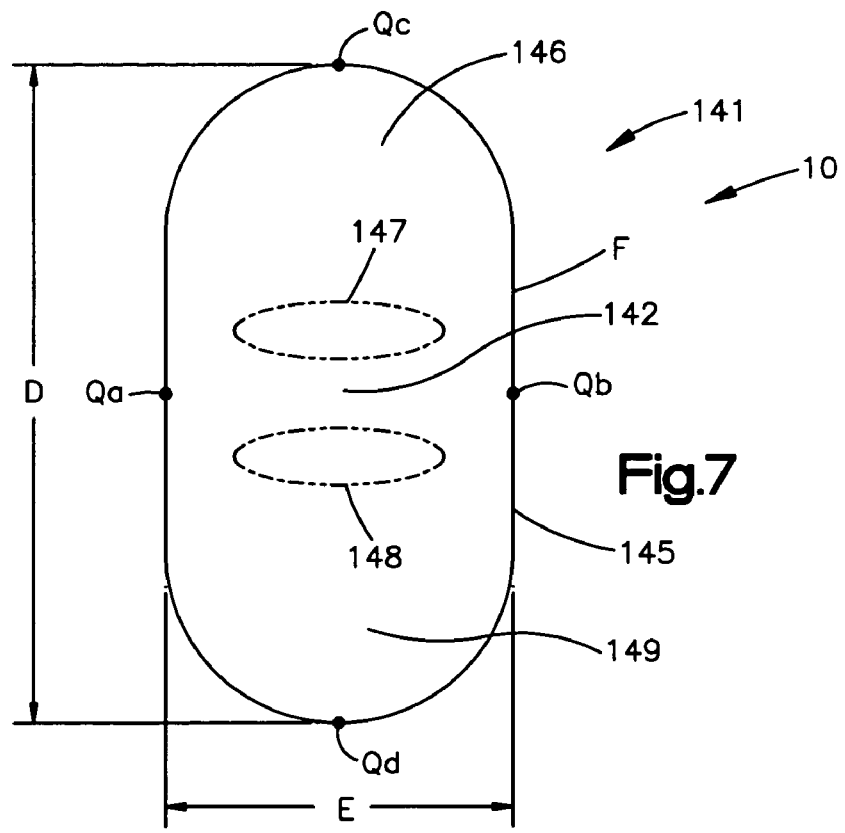
FIG. 7 is a schematic representation of another portion of an air bag in accordance with the present invention.
Figure 6:
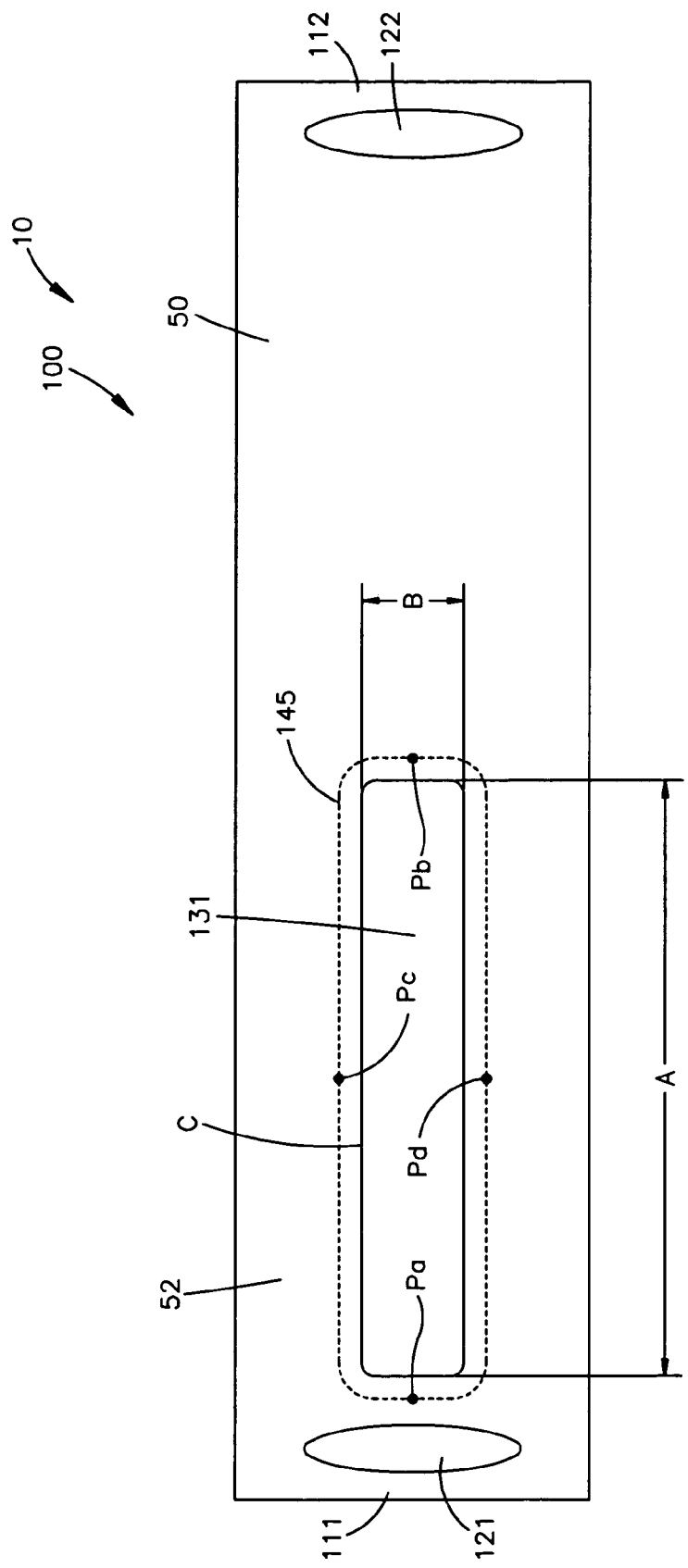
FIG. 6 is a schematic representation of a portion of an air bag in accordance with the present invention.

As seen in FIGS. 6 and 7, points Pa-Pd lie just outside of the perimeter C of the rectangular opening 131 and correspond to points Qa-Qd at the perimeter F of the pocket panel 141. The single sheet 100 and the pocket panel 141 may be overlapped at these corresponding points and sewn together to form a sew line 145.

When the air bag 10 is inflated, a downwardly open pocket 520 is formed for helping to protect an undersized or child size vehicle occupant 16 of the vehicle 17. When the air bag 10 is inflated, the pocket panel 141 forms the interior of the downwardly open pocket 520. The pocket panel 141 becomes U-shaped with ends (i.e., Qc, Qd) of the pocket panel 141 partly defining the lower end of the downwardly open pocket 520 of the inflated air bag 10 and the middle portion (i.e., Qa, Qb) defining the upper interior surface 521 of the downwardly open pocket 520 of the inflated air bag 10.

A portion 142 of the pocket panel 141 (FIG. 7) between the pleats 147, 148 forms the interior, upper surface 521 of the downwardly open pocket 520. A first end portion 146 of the pocket panel 141 forms one interior side surface of the downwardly open pocket 520. A second end portion 149 of the pocket panel 141 forms the other interior side surface of the downwardly open pocket 520.

The length A of the rectangular opening 131 (FIG. 6) and the length D of the pocket panel 141 (FIG. 7) determine the height H (FIG. 1) of the downwardly open pocket 520 when the air bag 10 is inflated. The width B of the rectangular opening 131 determines the width W of the downwardly open pocket 520.

The surfaces 521, 523, 524 become arcuate and convex when the air bag 10 is inflated because the inflation fluid expands the interior of the air bag 10 and forces the panels 70, 80, 100, 141 outward, thereby tensioning the seams 90, 92, 145. Thus, the surfaces 521, 523, 524, as well as the top 54, the bottom 56, the inboard side 58, and the outboard side 60, tend to bulge outward when the air bag 10 is inflated (FIG. 5).

From the above description of the invention, those skilled in the art will perceive improvements, changes and modifications in the invention. As a result, such improvements, changes and modifications within the skill of the art are intended to be covered by the appended claims.

Having described the invention, we claim the following:

1. An apparatus for helping to protect an occupant of a vehicle, said apparatus comprising:
    an inflatable vehicle occupant protection device having a stored, deflated position and an inflated position; and
    an inflation fluid source for providing inflation fluid to inflate said inflatable vehicle occupant protection device, said inflatable vehicle occupant protection device comprising:
    an elongated first panel having opposite end portions positioned overlying each other and interconnected to place said first panel in a continuous loop, said first panel including an elongated opening having a periphery, a length, and a width shorter than said length; and
    a second panel having a periphery interconnected with said periphery of said opening in said first panel, said second panel having a length and a width shorter than said length, wherein said second panel is sewn to said first panel such that said length of said second panel extends along said width of said opening of said first panel and said width of said second panel extends along said length of said opening of said first panel to define a downwardly open pocket for receiving a portion of a child size vehicle occupant when said inflatable vehicle occupant protection device is in said inflated position.

2. The apparatus as set forth in claim 1 wherein said second panel portion includes two surfaces, each of said surfaces defining a side of said downwardly open pocket.

3. The apparatus as set forth in claim 2 wherein said surfaces stabilize a child seat while avoiding engagement with the child size vehicle occupant.

4. The apparatus as set forth in claim 1 wherein said downwardly open pocket extends forward from a rear portion of said inflatable vehicle occupant protection device toward a front portion of said inflatable vehicle occupant protection device to form a channel for receiving the head of the child size vehicle occupant.

5. The apparatus as set forth in claim 1 wherein said inflatable vehicle occupant protection device further includes a tether for controlling the width of said downwardly open pocket when said inflatable vehicle occupant protection device is inflated.

6. The apparatus as set forth in claim 1 further including an internal tether for maintaining the shape of said downwardly open pocket and ensuring that said downwardly open pocket stabilizes a child seat.

7. The apparatus as set forth in claim 1 further including a flap of material for lying across the head of the child size vehicle occupant to protect the head of the child size vehicle occupant during a vehicle collision.

8. The apparatus as set forth in claim 1 wherein said inflatable vehicle occupant protection device further includes a flap extending downward into said downwardly open pocket when said inflatable vehicle occupant protection device is inflated.

9. The apparatus as set forth in claim 1 wherein said inflatable vehicle occupant protection device further includes pleats disposed within said downwardly open pocket for allowing an upper portion of said downwardly open pocket to expand to a uniform width throughout a height of said downwardly open pocket when said inflatable vehicle occupant protection device is inflated.

10. A method for making an inflatable vehicle occupant protection device of a vehicle, said method comprising the steps of:
    removing an elongated portion of material from a first panel to define an elongated opening having a length, a width shorter than the length, and a perimeter;
    folding the first panel so that opposite ends of the first panel overlap;
    attaching a second panel to the first panel along a first edge to form a first side portion;

attaching a third panel to the first panel along a second edge to form a second side portion; and attaching a fourth panel having a length and a width shorter than the length to the first panel along the perimeter of the opening, the length of the fourth panel extending along the width of the opening and the width of the fourth panel extending along the length of the opening such that, when the inflatable vehicle occupant protection device is inflated, a downwardly open pocket is formed for helping to protect a child in the vehicle.

11. The apparatus as set forth in claim 1 wherein said inflatable vehicle occupant protection device further comprises a first side panel adjacent an outboard side of said inflatable vehicle occupant protection device and a second side panel adjacent an inboard side of said inflatable vehicle occupant protection device.

12. The apparatus as set forth in claim 1 wherein said periphery of said second panel is sized to overlap the periphery of the opening in the first panel, the overlap being sufficient to facilitate an interconnection of said first and second panels.

13. The apparatus as set forth in claim 1 wherein said opening comprises an elongated rectangular opening having opposite longitudinal side edges extending parallel to the length of said opening, and said second panel comprises an elongated panel with rounded end portions and linear side edges extending between said end portions, said side edges extending parallel to the length of said second panel, a center point of each rounded end portion being interconnected with the first panel at respective midpoints along the longitudinal side edges of the opening.

14. The apparatus as set forth in claim 13 wherein center points of the opposite side edges of said second panel are interconnected with the periphery of said opening at respective midpoints along the side edges of said opening.

15. An inflatable vehicle occupant protection device comprising:

an elongated center panel having opposite end portions and longitudinally extending first and second edge portions extending between said opposite end portions, said opposite end portions being positioned overlying each other and interconnected to place said center panel in a continuous loop, said first panel including an elongated opening having a length and a width substantially smaller than said length;

a first side panel having a periphery interconnected with said first edge portions of said center panel;

a second side panel having a periphery interconnected with said second edge portion of said center panel; and an elongated bottom panel having a length and a width substantially smaller than said length, a periphery of said bottom panel interconnected with said center panel along said periphery of said opening, said bottom panel having a transverse orientation relative to said center panel such that said length of said bottom panel is centered along said width of said opening and said width of said bottom panel is centered on said length of said opening, said transverse orientation causing said bottom panel and said center panel to define a downwardly open pocket for receiving a portion of a child size vehicle occupant when said inflatable vehicle occupant protection device is inflated.

* * * * *

UNITED STATES PATENT AND TRADEMARK OFFICE
CERTIFICATE OF CORRECTION

| | |
|---|---|
| PATENT NO. | : 7,607,683 B2 |
| APPLICATION NO. | : 11/432062 |
| DATED | : October 27, 2009 |
| INVENTOR(S) | : Fischer et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 377 days.

Signed and Sealed this

Twelfth Day of October, 2010

David J. Kappos
*Director of the United States Patent and Trademark Office*